United States Patent [19]
Howard

[11] 3,827,175
[45] Aug. 6, 1974

[54] FISHING BOBBER
[76] Inventor: William E. Howard, 850 Stadelman Ave., Akron, Ohio 44320
[22] Filed: Aug. 11, 1972
[21] Appl. No.: 280,076

[52] U.S. Cl. ............................................. 43/44.95
[51] Int. Cl. .......................................... A01k 91/00
[58] Field of Search................. 43/44.95, 44.91, 3

[56] References Cited
UNITED STATES PATENTS
2,457,295  12/1948  Woodhead............................... 43/3
2,888,771  6/1959  Stephens et al..................... 43/44.91

Primary Examiner—Louis G. Mancene

[57] ABSTRACT

A fishing float device for attachment to a fishing line. This device consists primarily of an animated body having spring means, wire means, rubber plug means and a cap member frictionally securing the device to a fishing line.

3 Claims, 3 Drawing Figures

PATENTED AUG 6 1974 3,827,175

FISHING BOBBER

This invention relates to fishing tackle, and more particularly to a fishing bobber.

It is therefore the principal object of this invention to provide a fishing bobber which will have internal means for frictionally engaging a fishing line, the body portion serving to simulate a dog, a clown, a snowman or other shape.

Another object of this invention is to provide a fishing bobber of the type described, which will have a screw cap with flap means for receiving the fishing line transversely thereof, the cap portion including rubber plug means for frictionally engaging the fishing line.

A further object of this invention is to provide a bobber of the type described, which will have spring means for urging the rubber cap or plug against a second rubber plug, the device having a wire center member which will retain the body and the cap so as to prevent one from being separated from the other.

Other objects of the present invention are to provide a fishing bobber which is simple in design, inexpensive to manufacture, rugged in construction, easy to use and efficient in operation.

These and other objects will be readily evident upon a study of the following specification and the accompanying drawing wherein.

Figure 1:
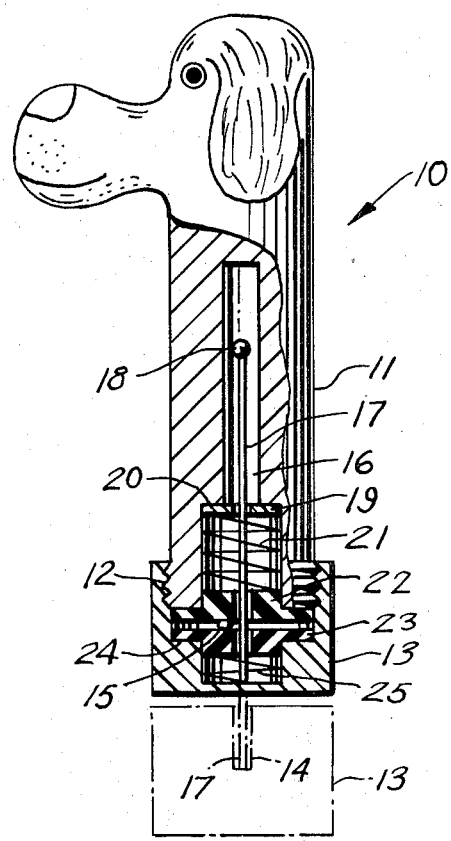
FIG. 1 is a vertical view of the present invention shown in section and in elevation with the lowered cap position shown in phantom lines.
Figure 2:
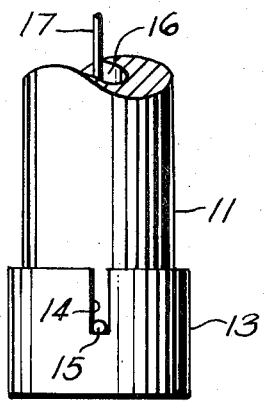
FIG. 2 is a fragmentary view of FIG. 1, showing the fishing line in the slot of the cap member of the device.
Figure 3:
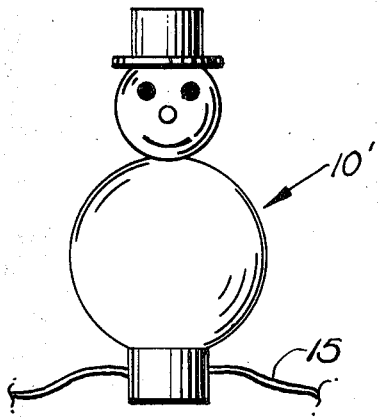
FIG. 3 is a vertical view showing another animated form of the invention which is shown in elevation.

According to this invention, a fishing bobber 10 is shown to include an animated body 11 made of a floatable material which will be boyant in water. The externally threaded end 12 of body 11 is threadably received within a cap member 13 having oppositely opposed slot portions 14 which enables the fishing line 15 to be carried transversely through the bobber 10. Within the central bore 16 of body 11, is freely carried a wire 17 having a ball shaped end 18, the opposite end of the wire 17 being fixedly secured within the bottom of cap 13, the wire 17 serving to keep the body 11 and the cap 13 together when cap 13 is removed from the end 12 of body 11.

The wire 17 is freely carried through the center washer 19 which abutts with the shoulder 20 within bore 16. A spring 21 carried within the lower portion of bore 16 of body 11, urges against washer 19 at one end and urges against a rubber plug 22 at its opposite end. A second rubber plug 23 carried within bobber 10, serves as a means in combination with plug 22, to frictionally engage line 15 when it is inserted within bobber 10. The plug 23 of device 10, is shouldered against shoulder 24 within cap 13 and a second spring 25 which is optional, urges against the bottom of plug 23 at one end and its opposite end urges against the bottom of cap 13.

In use, cap 13 is removed from the animated body 11 and the line is inserted into the slots 14 of cap 13 the cap 13 then is replaced upon the end 12 of body 11. The resulting action, causes the rubber plug 23 to frictionally engage the fishing line 15 and urge it against the rubber plug 22 thus preventing the line 15 from slipping within bobber 10.

What I now claim is:

1. A fishing bobber, comprising an animated and flotable body member, a cap member carried by said body and having upper and lower rubber plug members for frictionally engaging and securing a fishing line to said bobber, spring and washer means carried by said animated body for urging said rubber plugs against said fishing line and wire means carried by said bobber for preventing absolute separation of said body and cap member, said wire means being carried within a central bore of said body, said wire means including a ball shaped end which serves as stop means against the washer seated on a shoulder provided within said body member, and said wire extending through said rubber plug member and being secured fixedly within said cap member.

2. The combination according to claim 1, wherein said cap member is threaded on to the externally threaded and open end of said body member when securing said fishing line transversely within said bobber and said cap member includes a slot on each side so as to enable said line to be received transversely, said cap having shoulder means against which the flange rim portion of one of said plugs will abutt with and the flange portion of the upper rubber plug shoulders against the open end of said body member, the combination of said rubber plugs receiving between them, said fishing line and thus frictionally secures said line at any desired portion.

3. The combination according to claim 2, wherein the spring within said body member urges against the upper most rubber plug at one end and urges against the washer within said body at the opposite end, said washer shouldering against the shoulder within said body member and a second spring within said cap member urges against the end of the lower rubber plug at one end and urges against the bottom of said cap member when said cap member is received upon said body member of said bobber.

* * * * *